Sept. 29, 1942.                R. D. SYMONDS                2,297,638
            ZONE HEATING SYSTEM AND VALVE THEREFOR
                    Filed Sept. 12, 1939         2 Sheets-Sheet 2

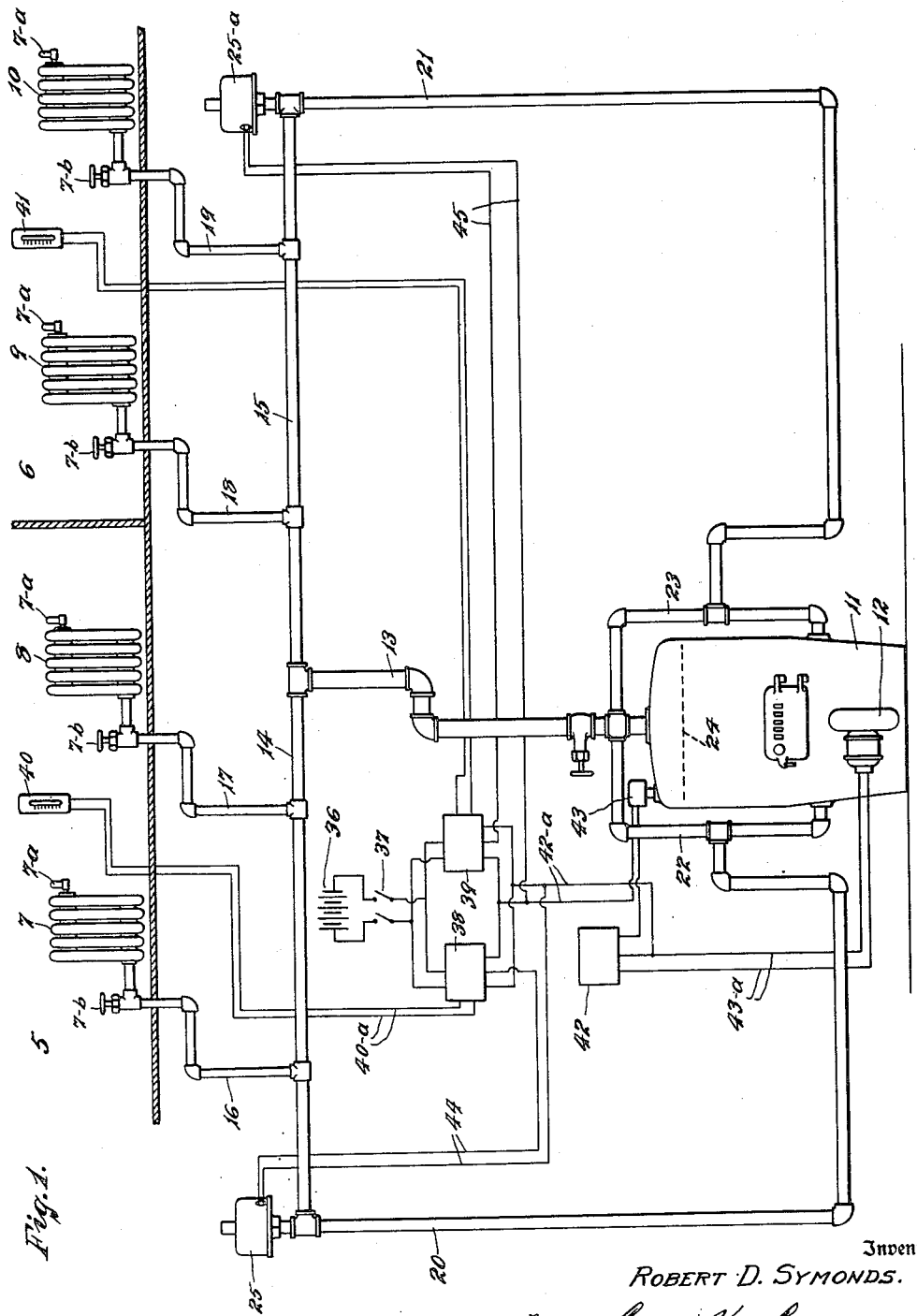

Inventor
ROBERT D. SYMONDS.
By Louis V. Lucia
Attorney

Patented Sept. 29, 1942

2,297,638

UNITED STATES PATENT OFFICE 2,297,638

ZONE HEATING SYSTEM AND VALVE THEREFOR

Robert D. Symonds, Wethersfield, Conn.

Application September 12, 1939, Serial No. 294,506

10 Claims. (Cl. 237—9)

This invention relates to zone heating systems and valve therefor and particularly to an improved system for maintaining predetermined temperature conditions in each of a plurality of zones which are supplied with heat from a single heating plant. The present invention may be used with advantage in connection with any heating system employing steam or the like as a heat exchange medium.

In heating systems, such as those for apartment houses, office buildings and the like, it is desirable, from the standpoint of economy, to supply heat to a plurality of rooms, apartments or like separate zones from a single central heating plant.

It is also desirable, for the convenience of the occupants of each of the different zones, that such systems be provided, for each zone, with a thermal responsive control means such as the commonly known thermostat, subject to individual adjustment and capable of maintaining predetermined temperatures in the respective zones.

It is required that the heating system be installed in such a manner that the proper amount of heat is supplied to each zone at any time that the temperature therein falls below the desired limit and regardless of the temperature conditions in any of the other zones. It is also desirable that no appreciable amount of heat be supplied to any zone which is at, or above, its minimum desired temperature limit even when the thermal responsive means in others of the zones are calling for heat.

When a zone calls for heat, it is very desirable that the said call be answered in the shortest possible time so that the temperature within the room or zone may be kept substantially constant; this object being obtained by the use of a novel valve, in connection with my improved zone heating system, which will permit rapid operation of the system and circulation of the heat exchange medium so that said medium will reach the zone which is calling for heat within the shortest period of time.

The object of this invention, therefore, is to provide a zone heating system which is highly efficient in maintaining a substantially constant temperature in different rooms or zones heated thereby, which is simple in construction and positive in its operation.

A further object is to provide a heating system having a valve which is automatically controlled, in connection with the thermal responsive means in a zone, to permit prompt circulation of the heat transfer medium, in that part of the system which is connected to the particular room or zone calling for heat, so as to prevent the temperature in said zone from dropping considerably before the said medium reaches the same.

Further objects of the invention will be clearly understood from the following description and from the accompanying drawings in which:

Figure 1 is a diagrammatic view illustrating an embodiment of the invention as applied to a steam heating system.

Figure 3:
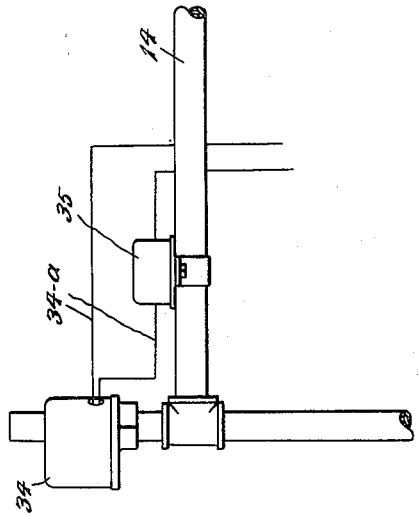
Figure 3 is a fragmentary view illustrating a modified form of a valve control which may be used in connection with my invention.

As illustrated in the drawings, the numerals 5 and 6 denote separate zones or rooms which are heated by means of radiators 7 and 8, and 9 and 10 respectively, each of which are provided with a vent valve 7—a the construction and operation of which is well known to those skilled in the art. The said radiators are supplied with a heat transfer medium which is heated in a central heating plant 11, of a conventional form, preferably by means of a hydrocarbon burner 12 that is electrically driven. The said heating plant is connected to all of said rooms or zones by means of a main supply pipe 13 which branches off into secondary supply pipes 14 and 15, each of which lead to the radiators in a separate zone. Thus, the secondary pipe 14 leads through a connecting pipe 16 to the radiator 7 and through a connecting pipe 17 to the radiator 8 in the zone 5. The secondary supply pipe 15 leads through connecting pipe 18 to the radiator 9 and through the connecting pipe 19 to the radiator 10 in the zone 6.

Each of said secondary pipes 14 and 15 are provided with a separate return pipe 20 and 21 which lead back into the heating plant 11 through equalizing pipes 22 and 23 that form what is commonly known as a Hartford loop; the said pipes 22 and 23 being connected to the bottom of the heat transfer medium chamber in the heater 11 and to the main supply pipe 13 so as to equalize the pressure in the heating plant and thereby retain the heat transfer medium substantially at a level such as indicated by the dotted line 24.

It is well known that in such heating systems as employ a heat transfer medium such as steam or the like, the circulation of the heat transfer medium is prevented or retarded by air which is drawn into the system when the pipes of said system are cooled and which becomes substantially locked therein since it cannot be expelled with sufficient speed through the vent valves 7a when steam is admitted into the system. It therefore becomes necessary to release the said air in order to permit the circulation of the steam. The said air generally becomes locked in the secondary supply pipes and also, to a smaller extent, within the radiators themselves.

Heretofore heating systems have been provided with air vents having an air opening of a small size so as to release the air from within the pipes and permit the heat exchange medium to circulate to the radiators. Such vents, however, have necessarily retarded the release of air from the systems to gradually release the same during the normal operation of the systems, with the result that the heat transfer medium has been delayed in reaching the radiators when heat was called for in the rooms or zones as indicated at 5 and 6.

In order to accelerate the travel of the heat transfer medium to a zone which is calling for heat, I provide, as an element of this invention, a combination thermally and electrically controlled rapid release valve 25 between each of the secondary supply pipes 14 and 15 and the return pipes 20 and 21.

Figure 2:
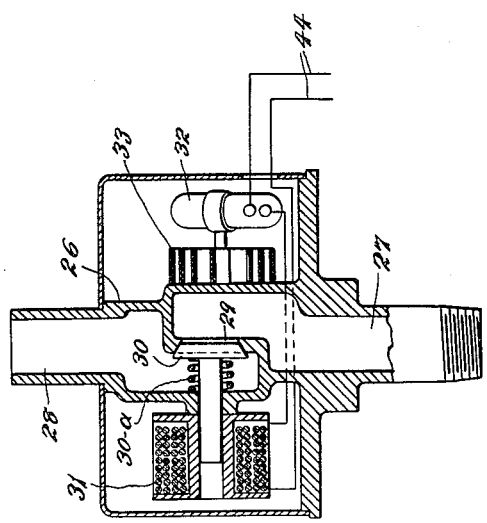
Fig. 2 is a view, in central vertical section, illustrating the form of valve used in connection with said system.

One form of said valve is clearly illustrated in Figure 2 of the drawings and comprises a housing 26 having a passage 27 connecting with a passage 28 through a valve opening 29 that is controlled by means of a valve head 30. The said valve is operated by a solenoid 31 which is connected in an electrical circuit, as will be hereinafter described, and also with a thermally controlled electric switch that may be in the form of a mercury switch, as indicated at 32, and which is operated by means of a thermostat, preferably in the form of a by-metal spiral coil 33 that is mounted in thermal conductive relation upon the housing 26 so as to cause the switch to close at a pre-determined temperature; the said thermal coil operating the mercury switch 32 in the manner hereinafter described.

In the modification illustrated in Figure 3, the said valve may be in the form indicated at 34 and may consist only of a solenoid for operating a valve similar to the valve 30. The thermally operated electric switch, to take the place of the electric switch 32, is mounted directly in thermal conductive relation to the pipe 14, spaced from the valve 34 and electrically connected therewith.

In order to operate the said system, I provide an electric circuit including a series of heat responsive means, relays and other conventional electrical apparatus for controlling the operation of the heating system in accordance with the temperatures required in the different zones. The said electric circuit includes a source of electric energy 36 which is connected through a switch 37 to relays 38 and 39; the relay 38 being controlled by a thermostat 40 which is located in the zone 5 and the relay 39 being controlled by the thermostat 41 in the zone 6.

Both of said relays are connected to a burner protector relay 42 through a pressuretrol 43 that is operated by the pressure in the heater 11. The protector relay 42 is connected to the burner 12 by means of the wires 42—a.

In cases where water is used as the heat transfer medium, an aquastat may be used in place of the pressuretrol.

A separate switch in the relay 38 is connected to the solenoid 31 in the valve 25 through the mercury switch 32, by means of the wires 44, and a similar switch in the relay 39 is likewise connected to the switch and solenoid in the valve 25—a by means of the wires 45.

The said circuit and control of my improved heating zone will be more clearly understood from a description of the operation thereof which is as follows:

When the system is put into operation the switch 37 is first closed to connect the electric supply source 36 in the electric circuit.

Assuming that it is desired to heat the zone 5 to a temperature of 72 degrees, the thermostat 40, which is of a conventional form, is set at 72. This will operate the relay 38 through the wires 40—a and cause the said relay to close a switch therein which will energize the solenoid 31, through the wires 44 and the mercury switch 32, to open the valve 25. At the same time, the relay 38 will also, through the wires 42—a and the pressuretrol 43, operate the protector relay 42, and, through the wires 43—a, energize the motor of the oil burner 12 and thereby start its operation.

The opening of the valve 25 will rapidly release the air from the secondary supply pipe 14 and permit free circulation of the heat transfer medium through the main supply pipe 13, the secondary pipe 14 and the connecting pipes 16 and 17, to the radiators 7 and 8 in the zone 5.

When the heat transfer medium has heated the valve 25 to a pre-determined temperature, the thermostatic coil 33 will operate the mercury switch 32 and cause it to interrupt the supply of energy to the solenoid coil 31; thus de-energizing the solenoid and permitting the spring 30—a to force the valve 25 into position to close the opening 29. Circulation of the heat transfer medium will then take place under normal conditions to the radiators 7 and 8; the release valves 7—a releasing any air that may have been locked in the said radiators to permit the heat transfer medium to heat the radiators.

When the said radiators have heated the zone 5 to a temperature of 72 degrees, the thermostat 40 will disconnect the circuit through the wires 40—a and cause the switch in the relay 38 to be opened, thus breaking the circuit to the oil burner and stopping the operation thereof.

Should the pressure of the heat transfer medium, above the water level 24 in the heat plant 11, reach a pre-determined point during the operation of the burner, and before the temperature in the zone 5 has reached the 72 degrees at which the thermostat 40 has been set, the pressuretrol 43 will break the circuit leading to the burner 12 and cause it to stop its operation. In such a case, the circulation of the heat transfer medium will continue on account of the pressure until the pressuretrol will again start the operation of the burner or the temperature in the zone 5 will have reached 72 degrees and caused the thermostat 42 to break the circuit through the relay 38.

The operation of my improved heating systems in the heating zone 6 is the same as that above described, with the exception that the thermostat 41 in said zone will control the circuit through the relay 39 independently of the thermostat 40, but will also operate the protector relay 42 and the burner 12 in the same manner.

The closing of the circuit through the thermostat 41 will cause operation of the valve 25—a to release locked air from within the secondary supply pipe 15 and thus permit circulation of the heat transfer medium to the radiators 9 and 10.

By the use of the release valves 25 and 25—a in my improved heating systems, the locked air will be rapidly released from within the supply pipe leading directly to the zone calling for heat so that the heat transfer medium may reach said zone quickly and thereby prevent the temperature in that zone from dropping an appreciable degree. However, while either of the zones are operating, a small amount of heat will reach the radiators of the other zones which may be inoperative by reason of the small amount of air which will be permitted to pass slowly through the vent valves 7a. This heat will not be sufficient to appreciably raise the temperature therein but will prevent that temperature from dropping to a point to which it would otherwise drop should circulation of the heat transfer medium be shut off entirely from the inoperative zone. This also provides an advantage in as much as the small degree of heat, which is thus furnished to an in-operative zone while the system is heating an active zone which is calling for heat, will prevent the temperature in the inoperative zone from dropping to a dangerous point.

Upon the cooling of the said radiators, air will be admitted to the system by vent valves 7—a. These valves will also permit air to be exhausted from the radiators as they are heated.

If it should be desired to disconnect the zone entirely from the heating system so as to prevent any of the heat transfer medium from reaching any of the radiators in that zone, it can be accomplished by simply shutting off the radiators by the operation of the customary valves 7—b.

It will be clearly understood from the above description that my invention provides a novel heating system with means for rapidly releasing locked air therefrom, to accelerate the initial circulation of the heat transfer medium therein so that the said medium will reach a zone which is calling for heat quickly; thus preventing the temperature in that zone from dropping to an excessive degree and thereby rendering it possible to maintain a more constant temperature in said zone while at the same time heating the zone to the desired temperature in the shortest possible period of time.

In the modification illustrated in Figure 3, the valve 34 may be of the usual construction such as used in commonly known solenoid valves. The size of said valve, as well as that of the preferred form of valve shown, however, being of a size which will permit rapid release of locked air from the heating system. The switch 35 may be of a common thermally operated type and mounted directly in contact with the pipe 14. When the said pipe is cold, the switch will be in closed position; thus closing the circuit to the solenoid in the valve 34 to permit the operation of said valve when the zone associated therewith calls for heat. As the heat transfer medium reaches that point of the supply pipe to which the switch 35 is connected, the thermostatic means in said switch will open the same and thereby break the circuit which leads to the solenoid coil in the valve 34, through the wires indicated at 34—a.

I claim:

1. A zone heating system of the character described comprising a central heating plant, space heaters located in separate zones, means for separately connecting the supply of a heat transfer medium from said central heating plant to each of said space heaters, an air releasing valve in said connecting means for separately causing rapid supply of said heat exchange medium to a space heater in each of said zones, an electrically controlled fuel burner in said heating plant and an electric circuit for controlling the operation of said system; the said circuit including a separate thermally responsive means in each of said zones, a separate relay for and controlled by each of said thermally responsive means, a solenoid for operating said valve, an electric switch for interrupting the supply of electric energy to said solenoid, heat responsive means for operating said switch and means for connecting said circuit whereby, upon the operation of one of said thermally responsive means, its respective relay will cause energization of the said solenoid, to open said valve, and simultaneously start the operation of said burner, and, upon the heat transfer medium having reached a pre-determined temperature in said connecting means, the said heat responsive means will cause the said solenoid to become de-energized, thereby permitting said valve to close.

2. A zone heating system comprising a central heating plant, an electrically controlled fuel burner for heating a heat transfer medium in said plant, separate means for connecting said plant to radiators in separate zones, a valve, having substantially the same capacity as said connecting means, in each of said connecting means for releasing locked air therefrom to permit free movement of said heat transfer medium to the radiator associated with said valve, separate thermally responsive means in each of said zones for causing the valve associated therewith to be opened and the said burner to be started in operation, thermally responsive means for causing said valve to be closed when the said heat transfer medium has reached a pre-determined temperature in said connecting means, and an air vent valve connected to each of said radiators for admitting and exhausting air therefrom.

3. A zone heating system of the character described comprising a central heating plant, separate space heaters in a plurality of zones, connections for separately communicating the supply of a heat transfer medium from said heating plant to the space heaters of each of said zones, a return connection from each of said connections to said heating plant, a valve located between each of said connections and said return connections for releasing locked air to separately permit the movement of the heat transfer medium to said zones, thermally responsive means in each of said zones for opening said valve to release locked air from said connection, and separate means responsive to the temperature of said connections for separately closing said valves.

4. A zone heating system of the character described comprising a central heating plant, separate space heaters in each of a plurality of zones, separate pipe connections for communicating the supply of a heat transfer medium from said heating plant to said space heaters, a valve in each of said pipe connections, for releasing air locked therein to permit the movement of the said heat transfer medium, an electrically operated fuel burner for heating said heat transfer medium, thermally responsive means in one of said zones, a relay operable by said thermally responsive means for closing an electric circuit to open said valve and to operate said burner, a separate heat responsive means in another of said zones, a separate relay to open the valve associated with said zone and to operate said burner, and separate thermally responsive means between each of said relays and said valves for causing said valves to close when the said heat transfer medium has reached a pre-determined temperature.

5. A zone heating system of the character described comprising a central heating plant for heating a plurality of zones, a space heater in each of said zones, a separate pipe connection from said heating plant to the space heater in each of said zones, a valve in each of said connections for releasing locked air therefrom, electrically operated means for opening said valve, a switch for controlling the operation of said electrically operated means, an electrically operated fuel burner in said plant and an electric circuit for controlling the operation of said system to independently maintain a pre-determined temperature in each of said separate zones, said electric circuit including separate thermally responsive means in each of said zones, a separate relay connected to each of said thermally responsive means, a separate electrical connection leading from each of said relays to the valve associated with the zone in which the thermally responsive means controlling the said relay is located, a common electric connection from said relays leading to said burner and a separate thermally operated switch between each of said valves and said relays for breaking the electrical connection to a valve when the pipe connections associated therewith reaches a pre-determined temperature.

6. A zone heating system comprising a central heating plant, a burner for heating said plant, separate space heaters located in a plurality of different zones, a separate pipe connection for communicating the supply of a heat transfer medium from said heating plant to the space heaters in each of said zones, said connection including a secondary supply pipe leading directly to a single zone, a return pipe leading from said secondary supply pipe to said heating plant, a valve between said secondary supply pipe and return pipe for releasing locked air from said system into the atmosphere to permit rapid movement of the said heat supply medium to said space heaters, means responsive to the temperature of the zone for opening said valve and initiating the operation of said burner and means responsive to the temperature of said pipe connections for closing said valve.

7. A zone heating system comprising a heating plant for heating a plurality of zones, heating means in said zones, a burner in said plant, supply pipes connected to said heating means for conveying a heat transfer medium thereto from said burner, return pipes connected to said supply pipes for returning a portion of said medium from said zones, an electric circuit for operating said burner, means responsive to changes in temperature in said zones for controlling said circuit means located in the vicinity of the connection between the said supply and return pipes for releasing air from said system to accelerate the passage of said heat transfer medium to said zones, and means in said circuit responsive to heat in said pipes for causing the operation of said air releasing means.

8. A zone heating system of the character described comprising a central plant for heating a heat transfer medium, space heaters located in a plurality of separate zones, means for communicating said heating plant with said space heaters including a main supply pipe, a plurality of separate secondary supply pipes each connected to a separate space heater in one of said zones, a separate valve for releasing locked air from one of said secondary supply pipes to permit movement of said heat transfer medium to the space heater connected to said pipe, and an electric circuit for controlling the operation of said system; said circuit including a separate thermally responsive device in each of said zones, a separate relay in said circuit for and controlled by each of said thermally responsive devices, means for electrically operating said valve including an electric switch in series with said relays, and means responsive to the flow of steam in said system in the vicinity of said valve for operating said switch to actuate said valve into closing position, and a fuel burner in said heating plant controlled by said relays.

9. A zone heating system of the character described comprising a central heating plant, space heaters located in separate zones, means including a supply pipe for separately communicating the supply of a heat transfer medium from said heating plant to a space heater in each of said zones, a valve in each of said supply pipes for releasing locked air therefrom to permit the passage of said heat transfer medium therethrough to said space heaters, and an electric circuit for controlling the operation of said system; said circuit including separate thermally responsive means in each of said zones, a separate relay for and controlled by each of said thermally responsive means, a solenoid in series with said relays and adapted upon energization thereof to open said valve, an electric switch in said circuit between said solenoid and said relays for controlling the operation of said valve, thermally responsive means actuated by heat in said pipes for operating said switch to de-energize said solenoid and cause said valve to be closed, an electrically operated burner connected to said relays, and means in said circuit for continuing the operation of said burner irrespective of said switch.

10. A zone heating system of the character described comprising a central heating plant, separate radiators in a plurality of zones for heating said zones, a separate connection for communicating the supply of heat transfer medium from said heating plant to each of said zones, a valve in each of said connections for releasing locked air therefrom, thermally responsive means in each of said zones for causing opening of the valve associated therewith to release air from said connection and thereby permit rapid movement of the heat transfer medium to a radiator in said zone, thermally operated means for closing said valve when the heat transfer medium in said zone has reached a pre-determined temperature in the vicinity of said valve, and an air vent valve connected to each of said radiators for admitting and exhausting air therefrom.

ROBERT D. SYMONDS.